(12) United States Patent
Morgensai et al.

(10) Patent No.: US 7,131,201 B2
(45) Date of Patent: Nov. 7, 2006

(54) COUPLING DEVICE AND IMPROVED METHOD OF ASSEMBLY THEREOF

(75) Inventors: Keith E. Morgensai, Marshall, MI (US); Robert J. Kyle, Battle Creek, MI (US); Monowar Zahir, Battle Creek, MI (US); Mark J. Shewchuck, Charlotte, MI (US); Christopher J. Babin, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 137 days.

(21) Appl. No.: 10/846,444

(22) Filed: May 14, 2004

(65) Prior Publication Data

US 2005/0252746 A1    Nov. 17, 2005

(51) Int. Cl.
*B21D 53/28* (2006.01)
*F16D 43/28* (2006.01)
*F16D 11/00* (2006.01)

(52) U.S. Cl. .................. 29/893.1; 29/893.2; 29/434; 29/525.01; 29/525.02; 192/85 AA; 192/103 F; 475/88

(58) Field of Classification Search .............. 29/893.1, 29/893.2, 434, 525.01, 525.02, 33 K, 33 R; 192/85 AA, 112, 103 F; 180/344; 403/335, 403/337; 475/88
See application file for complete search history.

(56) References Cited

U.S. PATENT DOCUMENTS

| 3,739,451 | A | * | 6/1973 | Jacobson ................... 29/237 |
| 5,090,868 | A | * | 2/1992 | Mosure et al. ............. 415/207 |
| 5,310,388 | A | | 5/1994 | Okcuoglu et al. ........... 475/88 |
| 5,964,126 | A | * | 10/1999 | Okcuoglu .................. 74/650 |
| 6,109,615 | A | * | 8/2000 | Gildea et al. .............. 277/349 |

* cited by examiner

Primary Examiner—Marc Jimenez
Assistant Examiner—Sarang Afzali
(74) Attorney, Agent, or Firm—Bradley J. Diedrich; L. J. Kasper

(57) ABSTRACT

A coupling device (11) and method of assembly, the device being of the type including a plenum member (17) disposed at one axial end of the coupling housing (13,15), the method comprising configuring the plenum member (17) such that each of the required features (55,57,61,66) is disposed circumferentially between an adjacent pair of fastener holes (18H). Next, the input ring gear (R) is installed about the housing (13,15) of the coupling device (11), from an axial end opposite said plenum member (17), into assembly position adjacent said flange portion (18). Each of a plurality (N) of fasteners (89) is inserted through one of the fastener holes (18H) and into initial threaded engagement with the input ring gear (R). Finally, by means of a fastener driver, all of the plurality (N) of fasteners (89) are driven into full threaded engagement, substantially simultaneously, with the input ring gear (R).

5 Claims, 6 Drawing Sheets

COUPLING DEVICE AND IMPROVED METHOD OF ASSEMBLY THEREOF

BACKGROUND OF THE DISCLOSURE

The present invention relates to coupling devices of the type used to transmit torque, for example, in a vehicle drive line, and more particularly, to a coupling device of the type having a bevel gear ring gear associated therewith as the input to the coupling device. The present invention also relates even more particularly to an improved method of assembly of such a coupling device.

As used herein, the term "coupling device" will be understood to mean and include a device which is able to transmit torque from an input to one or more outputs, and in which there is a clutch assembly disposed between the input and the output, such that the torque transmission of the coupling device is in some way related to the extent of engagement of the clutch assembly. Within the scope of the present invention, the term "coupling device" means and includes both gear-type devices (such as bevel gear differentials), as well as gearless-type (clutch only) coupling devices.

Although the improved method of assembly of a coupling device may be utilized with many different types and configurations of coupling devices, such as coupling devices made in accordance with the teachings of U.S. Pat. No. 5,964,126, assigned to the assignee of the present invention and incorporated herein by reference, it is also quite advantageous when utilized in conjunction with vehicle differentials of the type illustrated and described in U.S. Pat. No. 5,310,388, also assigned to the assignee of the present invention and incorporated herein by reference. It is believed that those skilled in the art of differential and coupling devices will have a much better understanding of the potential scope of the present invention from a reading and understanding of the remainder of the specification.

A common factor in most differentials and coupling devices, of the type to which the present invention relates, is the presence of some sort of annular input ring gear (typically, of a "bevel" gear configuration) which serves as the "input" to the coupling device, in terms of the torque flow path. Typically, input drive is transmitted from the vehicle driveline by means of an input pinion gear to the ring gear, in a manner well know in the driveline art. Also typically, the housing of the coupling device defines a radially extending flange portion, and the annular ring gear is disposed about the housing of the coupling device and is fastened to the flange portion, typically by means of a plurality of bolts. The coupling device is normally manufactured by someone such as the assignee of the present invention, and is then shipped to the axle or vehicle assembly plant where the coupling device and the ring gear are fastened together, and then the entire coupling device-ring gear subassembly is installed within an outer differential housing. As is well known to those skilled in the art, it is typically the outer differential housing which serves as a fluid reservoir (low pressure source) for the lubrication fluid required for use in the coupling device. In the coupling devices of the cited patents, there is included a clutch pack operable to transmit torque between the input (the combination of the ring gear and the coupling housing) and the output (one of the axle shafts). The degree of engagement of the clutch pack is determined by fluid pressure in a piston chamber in which the fluid pressure biases a clutch piston against the clutch pack. The differential coupling devices of the cited patents include a gerotor pump, integral with the coupling device, the gerotor pump having one rotor fixed to rotate with the input and the other rotor fixed to rotate with the output. As used herein, the term "clutch pack" will be understood to mean and include not only a multiple friction disk-type clutch pack, but also, any of the other well known types of clutch assemblies, such as cone clutches, etc. in which the degree of engagement is generally proportional to the fluid pressure acting on the clutch piston, or on an equivalent clutch-engagement structure.

It should be understood that the present invention is not limited to a coupling device of the type that includes a gerotor pump, nor to a coupling device having any particular type of clutch and clutch piston arrangement, except to the extent specifically noted hereinafter in the appended claims. However, as will be understood by those skilled in the art from a reading and understanding of the subsequent specification, the assembly method of the present invention is more likely to be of benefit, and be needed, in conjunction with a coupling device having some sort of "on-board" source of fluid pressure (such as a gerotor pump) which serves as the source for pressurized fluid in the clutch piston chamber. Furthermore, the assembly method of the present invention is especially advantageous if the coupling device includes some sort of pressure control valve assembly for controlling the instantaneous fluid pressure in the piston chamber, in response to the need for torque transmission through the coupling.

In the differential coupling device of the present invention there is disposed about one end of the coupling housing a plenum member which serves, in part, to define a substantial portion of the hydraulic circuit which controls the piston apply pressure in the piston chamber. In the subject embodiment of the invention, this plenum member defines a number of required "features" as that term will be amplified and described in greater detail subsequently, one example of such a "feature" being a portion which extends radially downward into the low pressure reservoir, or sump, defined within the outer differential housing and which therefore serves as the "inlet" to the hydraulic circuit. Another example of such a "feature" is a portion which extends radially outward from the plenum member, and on which the pressure control valve assembly is mounted.

In developing a commercial embodiment of the present invention, it was determined that, partially because of such required "features" on the plenum member, the assembly process was greatly complicated and, as a result, made unacceptably expensive. It is well known to those skilled in the art of assembling such differential coupling devices, that the preferred method of assembling the coupling device and the ring gear in the axle or vehicle assembly plant is to manually insert each of the fasteners through the flange portion of the housing and partially thread the fasteners into the ring gear. Subsequently, the assembly operator would use a bolt driver, having a separate driver for each of the fasteners, such that all of the fasteners are fully threaded into the ring gear simultaneously. However, on the coupling device of the present invention, the ring gear is installed from one end of the coupling housing, until it is seated in a face-to-face relationship with the flange portion. The plenum member is disposed at the opposite axial end of the coupling housing, and therefore, the fasteners must be inserted through the flange portion and into the ring gear from the end of the coupling housing where the plenum member is disposed, and in addition, the bolt driver must be able to engage each of the bolts from the end where the plenum member is disposed.

BRIEF SUMMARY OF THE INVENTION

Accordingly, it is an object of the present invention to provide an improved coupling device, and an improved method of assembly thereof, in which the plenum member has all of its required structural features, but in which it is still possible to drive all of the fastener members through the differential coupling device flange portion into the ring gear, simultaneously.

It is another object of the present invention to provide such an improved coupling device and method of assembly thereof which makes it possible for the relatively more critical steps of the assembly process to be performed in connection with the manufacture of the coupling device, while primarily the relatively less critical steps of the assembly process (except for the critical step of tightening the ring gear fasteners) are left to be done in the vehicle (or axle) assembly plant.

The above and other objects of the invention are accomplished by the provision of an improved method of assembly of a coupling device to an input ring gear, for eventual installation within an axle housing, the coupling device including a housing defining a clutch cavity, a clutch assembly disposed in the clutch cavity, a clutch apply member disposed in a pressure chamber and operable to bias the clutch assembly into torque transmitting relationship in response to the presence of pressurized fluid in the pressure chamber. The coupling device includes a plenum member operably associated with the housing to define a fluid flow path providing fluid communication between a reservoir disposed within the axle housing and the pressure chamber, the fluid flow path being in fluid communication with a source of pressurized fluid. The housing includes a flange portion defining a plurality of fastener holes and being adapted to have the input ring gear attached thereto by means of a plurality of fasteners. The plenum member comprises a generally annular plenum portion, and a plurality of required features extending radially from the plenum portion.

The improved method of assembly comprises the steps of:
(a) configuring the plenum member such that each of the required features is disposed circumferentially between an adjacent pair of said fastener holes;
(b) installing the ring gear about the housing of the coupling device, from an axial end opposite the plenum member, into assembly position adjacent the flange portion;
(c) inserting each of the plurality of fasteners through one of the fastener holes and into initial threaded engagement with the input ring gear; and
(d) driving, by means of a fastener driver, all of the plurality of fasteners into full threaded engagement, substantially simultaneously, with the input ring gear.

In accordance with a more limited aspect of the invention, one of the required features defined by the plenum member comprises a fluid inlet portion extending radially toward the reservoir, and another of the required features comprises a valve mounting portion, the coupling device including an electromagnetic valve member, operable to control fluid pressure in the fluid path, the method of assembly comprising the further step, subsequent to the step (d), of operably attaching the valve member to the valve mounting portion.

DETAILED DESCRIPTION OF THE PREFERRED EMBODIMENT

Figure 1:
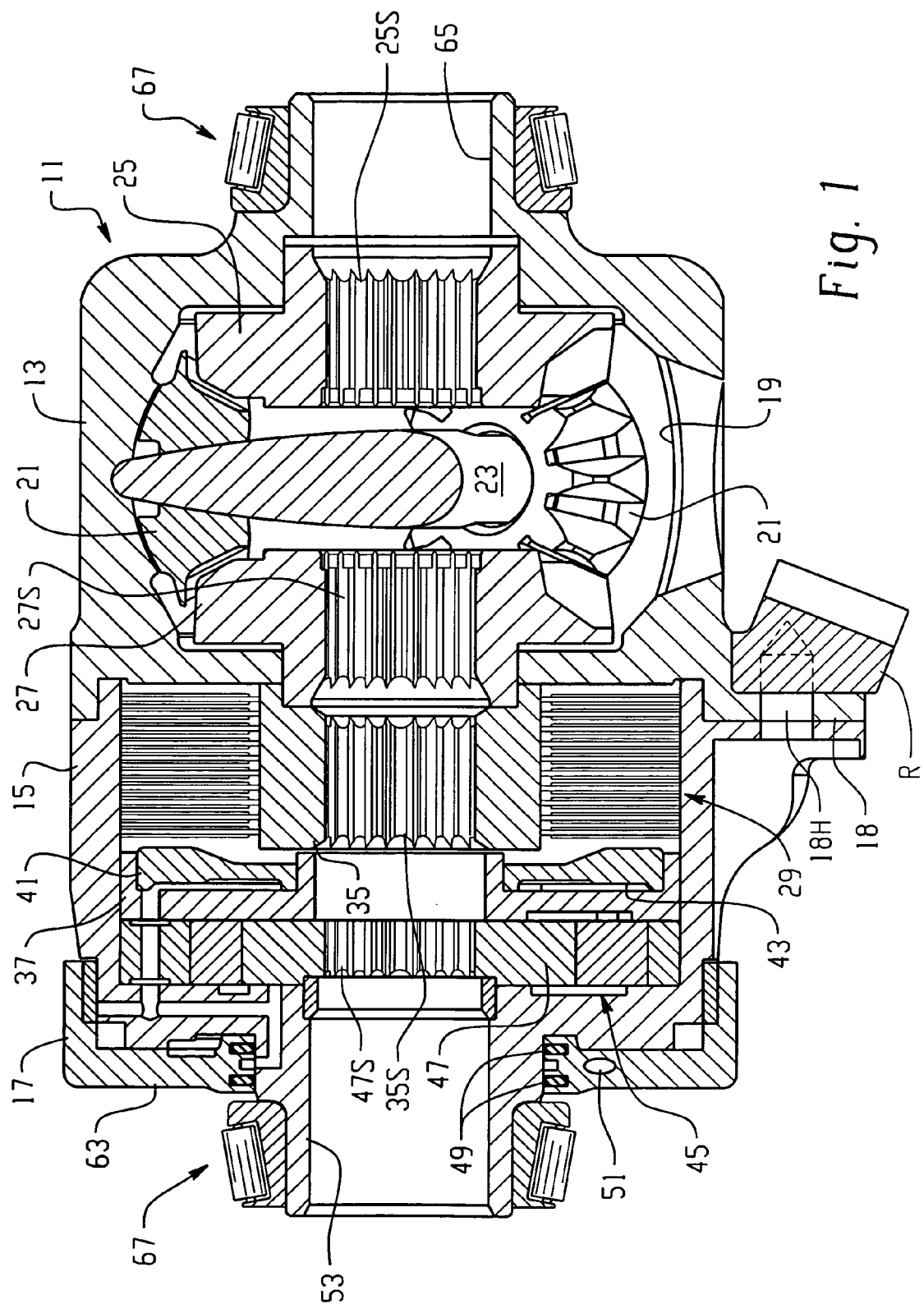
FIG. 1 is an axial cross-section of a vehicle differential coupling of the type with which the present invention may be utilized.

Referring now to the drawings, which are not intended to limit the invention, FIG. 1 illustrates a differential coupling device, generally designated 11, for use in a vehicle drive line, and which is of the general type illustrated and described in the above-incorporated patents, and which is especially well-suited for use in connection with the assembly method of the present invention. The differential coupling device 11 comprises a housing, including a gear housing 13, a clutch housing 15, and a valve housing 17, held together by any suitable means, well known in the art. In a manner well known to those skilled in the differential art, the gear housing 13 and the clutch housing 15 cooperate to define a radially extending flange portion 18 (shown only in the bottom half in FIG. 1), and disposed adjacent to the flange portion 18 is an annular ring gear R, shown somewhat pictorially in FIG. 2 with the teeth not being visible. The flange portion 18 defines a plurality of fastener holes 18H, to be used to fasten the ring gear R to the flange portion 18, as will be described in greater detail subsequently.

Referring still to FIG. 1, the gear housing 13 defines a gear chamber 19, and disposed therein, but by way of example only, there may be provided a typical differential gear set. In the subject embodiment, there is included a pair of input pinion gears 21, rotatably mounted relative to a pinion shaft 23, the pinion gears 21 being in toothed engagement with a pair of side gears 25 and 27. In the subject embodiment, and again by way of example only, the input pinion gears 21 (along with the ring gear R and the housings 13 and 15) may be considered the "input" to the coupling device 11, while the side gears 25 and 27 (and the axle shafts which would be splined thereto) comprise the "outputs" of the coupling device 11. More specifically, for purposes of most of the subsequent description, the side gear 27 will be considered to comprise the "output" of the coupling 11.

The side gears 25 and 27 define sets of straight, internal splines 25S and 27S, respectively, which are adapted to receive right and left axle shafts (not shown herein), whereby the coupling device 11 transmits torque by means of the axle shafts to associated vehicle drive wheels (also not shown). It should be clearly understood, however, that the structure described hereinabove is by way of example only, and the method of assembly of the present invention may also be used with various other types of structures.

Referring still primarily to FIG. 1, there is disposed within the clutch housing 15 a clutch pack, generally designated 29, which, as is well known to those skilled in the art, typically comprises a plurality of outer disks (no reference numeral herein) which are in splined engagement with a set of internal splines defined by the clutch housing 15. In addition, the clutch pack 29 would typically include a plurality of inner disks (no reference numeral herein), which are interleaved with the outer disks in a well known manner, the inner disks being in splined engagement with a coupling member 35. The coupling member 35 defines a set of internal splines 35S which are also in splined engagement with the left axle shaft, such that the coupling member 35 is fixed, in the subject embodiment, to rotate with the side gear 27.

Also disposed within the clutch housing 15 is an annular housing insert 37 which cooperates with the adjacent coupling member 35, and with the clutch pack 29, to define a clutch cavity or clutch piston chamber. Disposed within the clutch piston chamber, and moveable axially therein, is a clutch piston 41 which cooperates with the housing insert 37 to define a piston pressure chamber 43. As is well known to those skilled in the art of such devices, variations in the fluid pressure in the piston pressure chamber 43 will result in variations in the axial force applied by the clutch piston 41 to the clutch pack 29 and therefore, will result in variations in the "bias torque", i.e., the torque transmitted through the clutch pack from the input of the coupling 11 to the output.

Referring still primarily to FIG. 1, also disposed within the clutch housing 15, and immediately to the left of the housing insert 37, is a gerotor pump, generally designated 45, which is well known from the above-incorporated patents, and will not be described in detail herein. As is now well known to those skilled in the art, the gerotor pump 45 would include an inner rotor 47 defining a set of straight, internal splines 47S which are also in engagement with the left axle shaft, as described previously, such that the inner rotor 47 is fixed to rotate with the coupling member 35 and the side gear 27. During normal, straight-ahead operation, the entire differential coupling 11 rotates as a unit, i.e., the ring gear R, the housings 13 and 15, and the side gears 25 and 27 (as well as the axle shafts splined thereto) all rotate at the same rotational speed. In that condition, there is no relative rotation between the rotors of the gerotor pump 45, and therefore, there is no pumping of pressurized fluid from the volume chambers (formed between the teeth of the rotors when they are relatively rotating).

As is also well known to those skilled in the coupling device art, based in part upon the teachings of the above-incorporated patents, when there is differentiation, i.e., when there is a difference in the speed of rotation between the left and right axle shafts, there will also, of necessity, be a speed difference between the coupling input and the output (the left axle shaft). That speed difference between the input and output will result in the rotation of the left axle shaft driving the inner rotor 47 of the gerotor pump 45, thus pumping pressurized fluid, such that the fluid will eventually be communicated through appropriate chambers and ports in the housing insert 37, and the pressurized fluid is eventually communicated into the piston pressure chamber 43. The entire fluid circuit, for controlling the pressure in the piston pressure chamber 43, as well as a preferred method for controlling the circuit, is illustrated and described in greater detail in co-pending application U.S. Ser. No. 10/795,651, filed Mar. 8, 2004 in the name of Christopher J. Babin for a "Coupling Device And Improved Method Of Controlling Torque Transmission", assigned to the assignee of the present invention and incorporated herein by reference.

Referring still to FIG. 1, it may be seen that the valve housing 17 (also referred to hereinafter as the "plenum member"), which is stationary within, and relative to the outer differential housing H (which is shown only in FIG. 4), receives on its inner periphery, a pair of seal members 49 which are disposed on axially opposite sides of a radial passage 51. Thus, references hereinafter, and in the appended claims, to the "fluid flow path" will bear the reference numeral "51", because the radial passage 51 comprises a part of the fluid flow path, and the other portions thereof either are not visible or do not bear reference numerals in FIG. 1. The seal members 49 are in sealing engagement against the adjacent, outer cylindrical surface of a hub portion 53 formed integrally with the clutch housing 15. As may best be seen in FIGS. 2, 3 and 6, the plenum member 17 includes an inlet portion 55 which, preferably, extends down into a "source" of low pressure fluid, which would typically comprise a reservoir or sump containing fluid, and being disposed within the outer differential housing H, as is well known. The plenum member 17 also includes a port portion 57 which defines one or more fluid passages in communication with the radial passage 51. As will be described in greater detail subsequently, the port portion 57 has mounted therein a pressure control valve assembly, generally designated 59, shown as a separate sub-assembly in FIG. 5, and shown installed into the plenum member 17 in FIG. 6, as will be described in greater detail subsequently.

In accordance with an important aspect of the present invention, the inlet portion 55 and the port portion 57 both comprise what are hereinafter referred to as "required features" of the plenum member 17, i.e., both the inlet portion 55 and the port portion 57 are required parts of the plenum member 17, in order for the plenum member 17 to perform its function, which includes providing fluid to the fluid flow path (radial passage 51) and controlling the pressure in the piston pressure chamber 43. Certain other types of "required features" of the plenum member 17 will be discussed subsequently.

Figure 2:
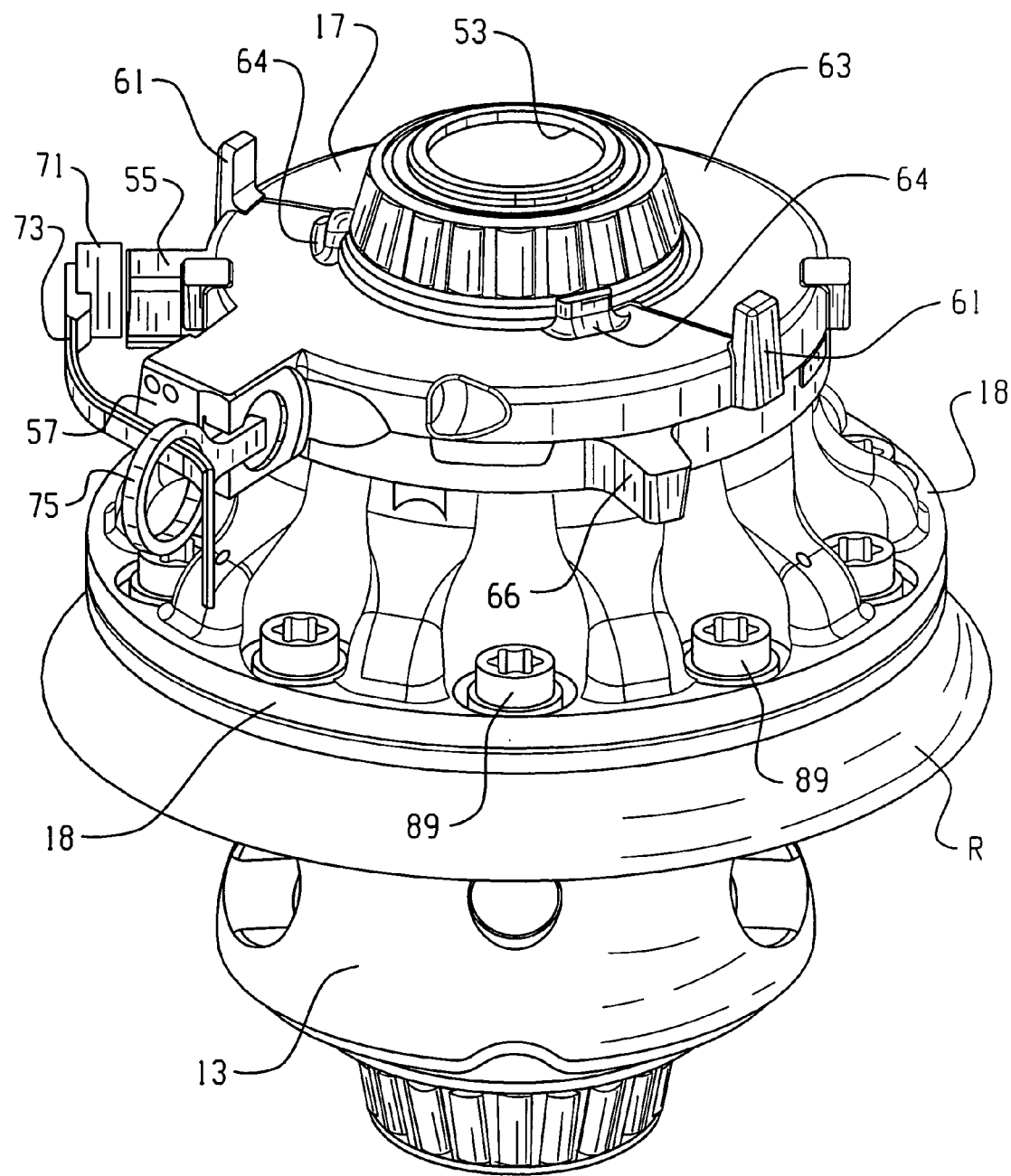
FIG. 2 is a perspective view of the differential coupling device after assembly thereto of the input ring gear.
Figure 3:
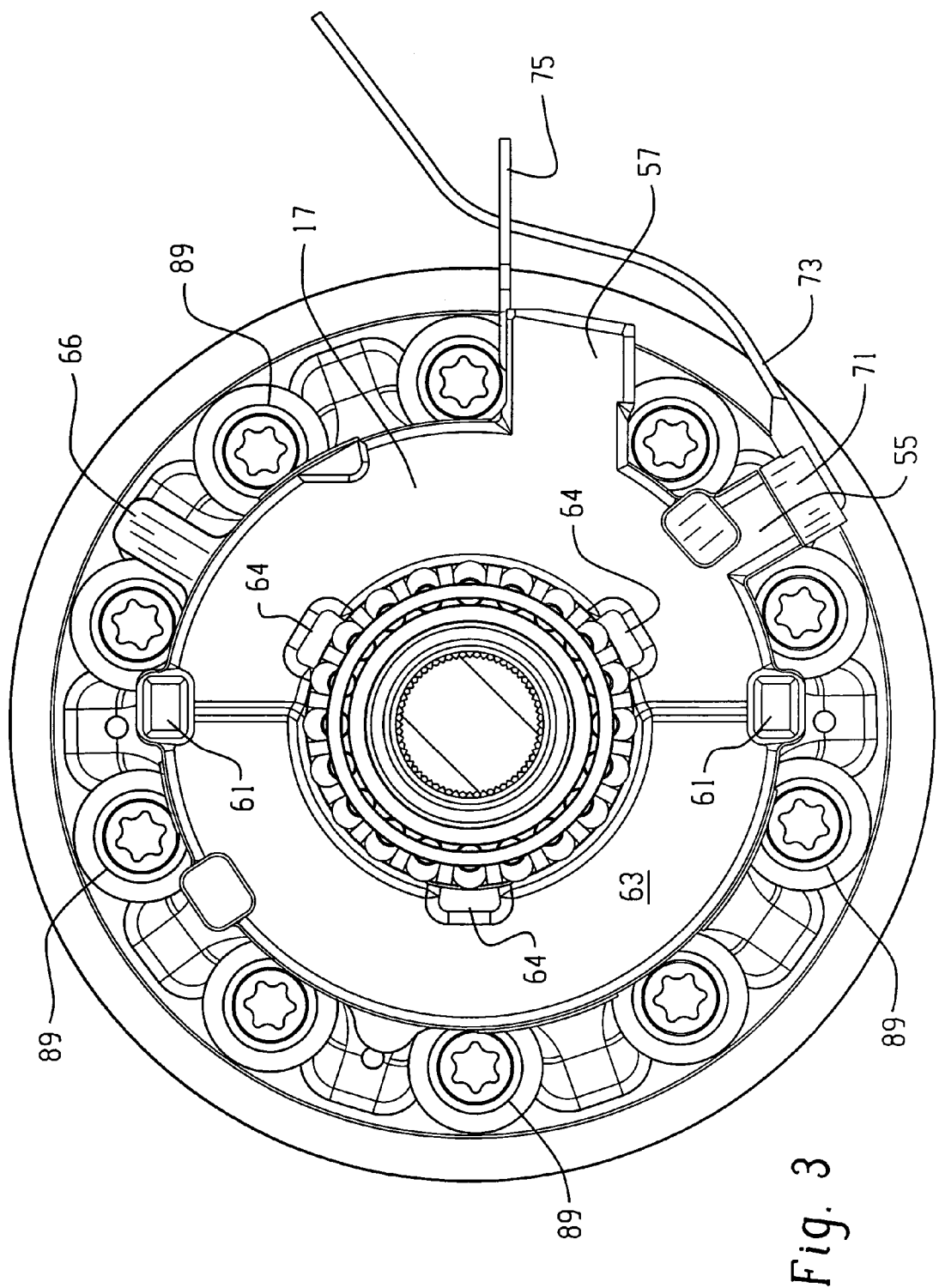
FIG. 3 is a plan view of the coupling device and ring gear assembly, viewed from the left end in FIG. 1, illustrating certain key aspects of the present invention.
Figure 4:
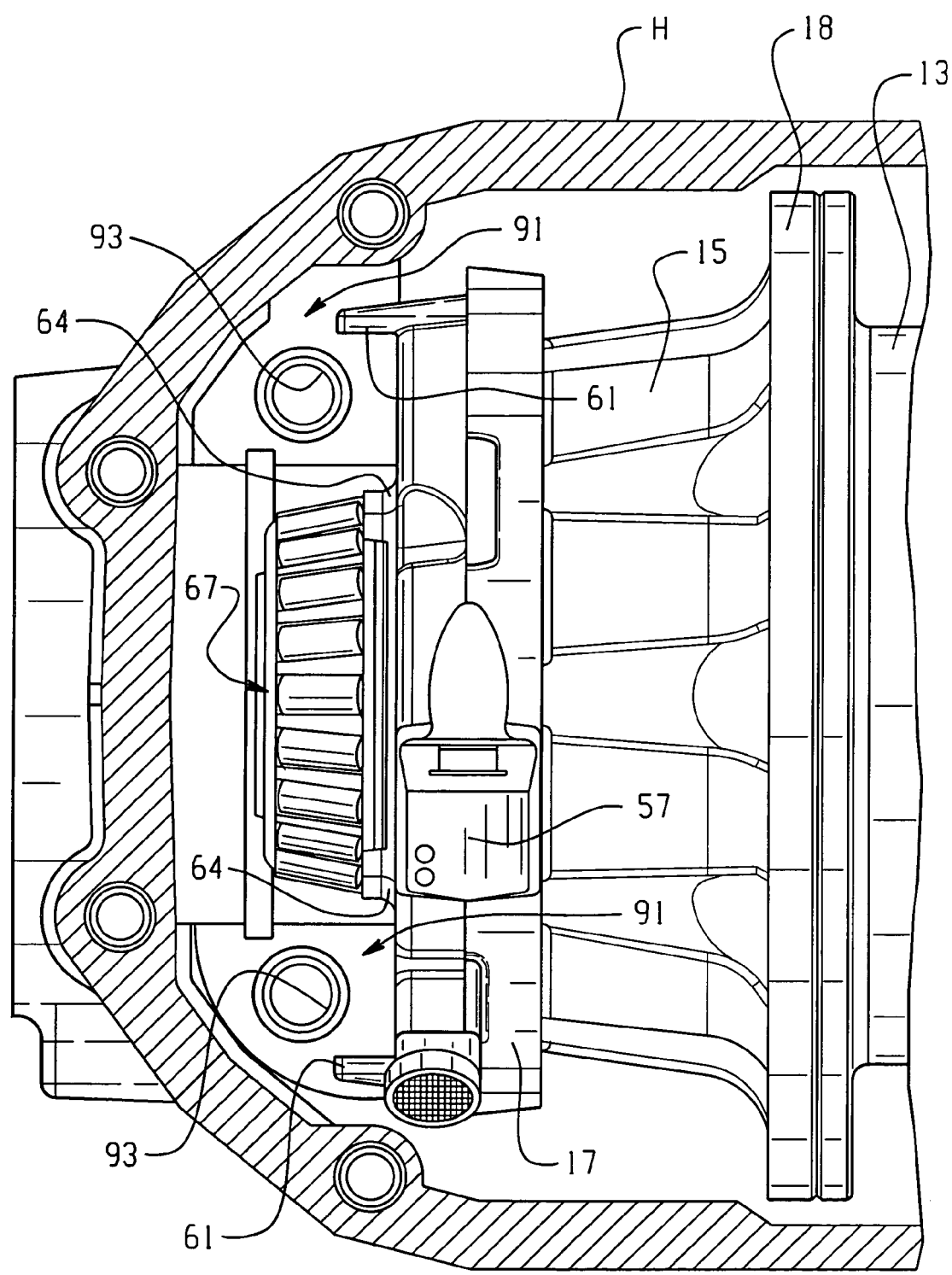
FIG. 4 is a fragmentary plan view of the outer differential housing after the coupling device has been installed therein, but with the ring gear omitted from the view for ease of illustration.

Referring now primarily to FIGS. 2 and 3, it may be seen that the plenum member, in the subject embodiment and by way of example only, includes three additional "required features", which include a pair of anti-rotation tabs 61, the function of which will be described in greater detail subsequently. The anti-rotation tabs 61 are approximately diametrically opposite each other, and as may best be seen in FIG. 2, extend axially from an end surface 63 of the plenum member 17, such that the tabs 61 would extend to the left from the end surface 63 in FIG. 1, if the view of FIG. 1 were on a plane which included the tabs 61. The plenum member 17 also includes a plurality of spacer tabs 64, also extending to the left in FIGS. 1 and 2 from the end surface 63, the function of the spacer tabs 64 to be described subsequently. Finally, the plenum member 17 includes a wiring retention tab 66, the function of which will also be described subsequently.

Referring now primarily to FIGS. 1 and 2, it may be seen that the gear housing 13 includes a hub portion 65, which may be substantially identical to the hub portion 53 of the clutch housing 15. By way of example only, at the end of the process of assembling the coupling device 11, a pair of tapered roller bearing sets 67 are pressed onto the hub portions 53 and 65, typically, both bearing sets 67 being pressed on at the same time, on an appropriately configured press station, as is well known in the art, the details of which form no part of the present invention. As may be seen in FIGS. 1 and 2, the references herein to the "bearing sets" mean and include only the inner race and the rollers themselves, but not the outer race, for reasons which will be explained subsequently. Once the bearing sets 67 are pressed onto the hub portions 53 and 65, the juxtaposition of the left hand bearing set (i.e., the outer race of the bearing set 67, after it is subsequently added) and the spacer tabs 64 insures that the plenum member 17 will not move leftward in FIG. 1, away from its desired, assembled position, as shown in FIG. 1.

Although, for purposes of illustration and explanation, FIGS. 1 and 2 include the ring gear R, it should be understood that typically, after the completion of the assembly of the coupling device 11 (including the pressing on of the bearing sets 67 as just described), the coupling device 11 would be shipped to the axle assembly plant, for assembly of the coupling device 11 into the overall axle assembly. Typically, it would be at the axle assembly plant that the ring gear R would, for the first time, be assembled to the coupling device 11. As will be understood by those skilled in the art, in some commercial situations, the "axle assembly plant" is in reality the assembly plant at which the final assembly of the entire vehicle takes place. However, for purposes of the present specification, references to the "assembly plant" will be understood to mean and include the place of assembly of the coupling device 11 into the overall axle housing and assembly, whether or not that is part of the final vehicle assembly. Furthermore, "axle assembly plant" could even include the plant at which the coupling device 11 is assembled, if the ring gear R is also assembled there.

Referring again primarily to FIGS. 2 and 3, one additional feature of the coupling device 11, as it is shipped to the assembly plant, will be described. In connection with the development of a commercial embodiment of the coupling device 11, it has been determined that it is desirable to have the entire fluid path 51 (hydraulic circuit) within the coupling device 11 filled with fluid prior to shipment, rather than having to fill the coupling device with fluid as a separate step during the axle assembly process. Filling with oil before shipment of the coupling device 11 is done in order to test for leaks and missing seals, and after such testing is complete, it would be difficult and time-consuming to drain the fluid out of the coupling device prior to shipment. Finally, filling the coupling device with fluid saves the customer (axle or vehicle assembler) time, not having to "prime" the coupling device (i.e., fill it with oil) at axle assembly plant. Therefore, the inlet portion 55 has a suitable oil plug 71 inserted within the opening (not shown) of the inlet portion 55. Those skilled in the art will understand that there is also a need for a coarse filter screen 72 (shown only in FIG. 6) within the inlet portion 55 to keep out debris, metal chips, and lint. The oil plug 71 would typically comprise a molded plastic member, including a tab portion 73 formed integrally therewith. Similarly, the port portion 57 has, inserted therein, an oil plug, disposed within the port portion 57 and not visible in FIGS. 2 and 3, but which would also comprise a molded plastic member, including a tab portion 75, which is visible in both FIGS. 2 and 3. In the subject embodiment, and by way of example only, the tab portion 75 comprises a circular loop, with the tab portion 73 of oil plug 71 passing therethrough, for reasons to be explained subsequently, in connection with the assembly process.

Figure 5:
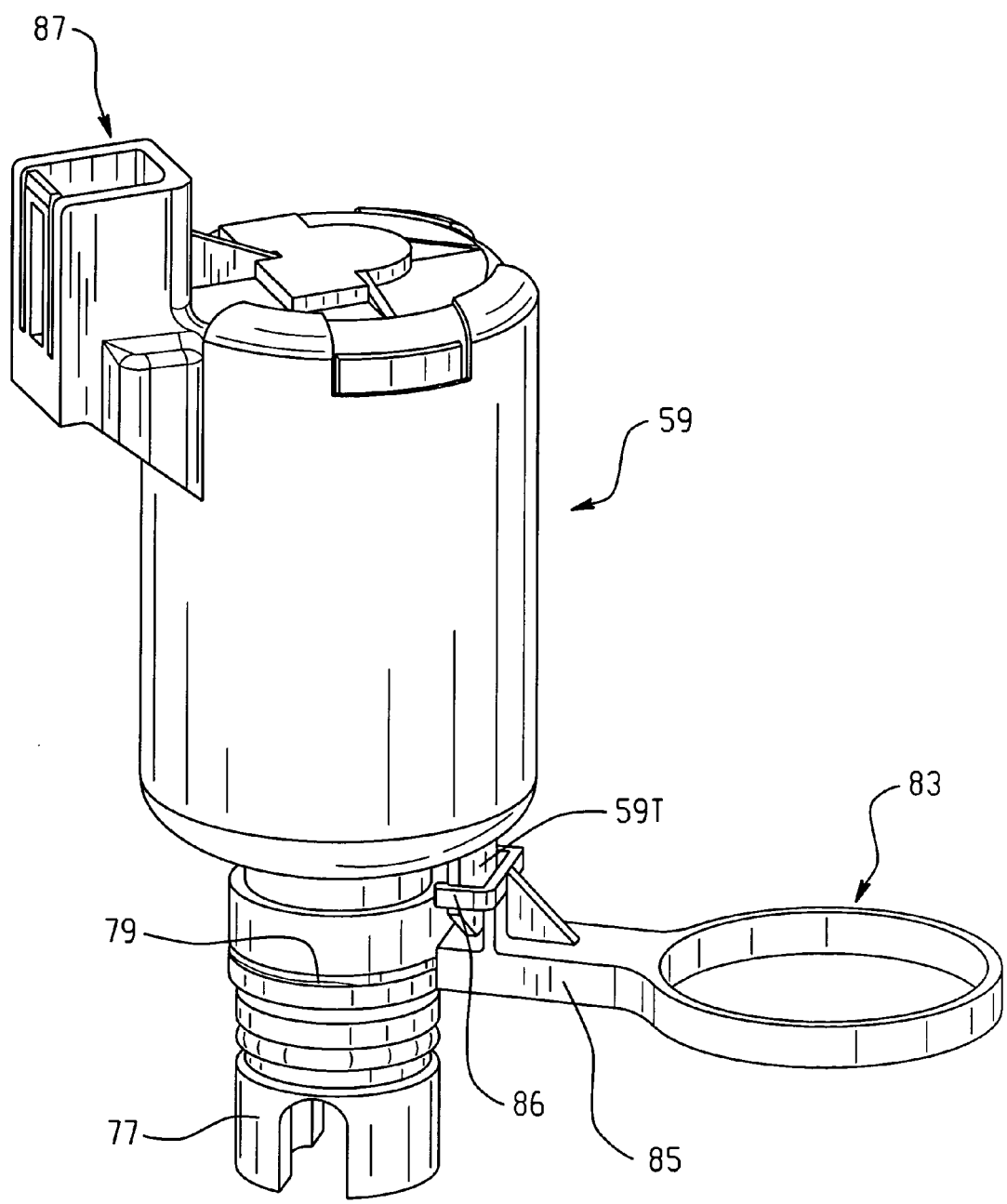
FIG. 5 is an enlarged perspective view of the pressure control valve assembly, as it is prior to assembly into the coupling device.
Figure 6:
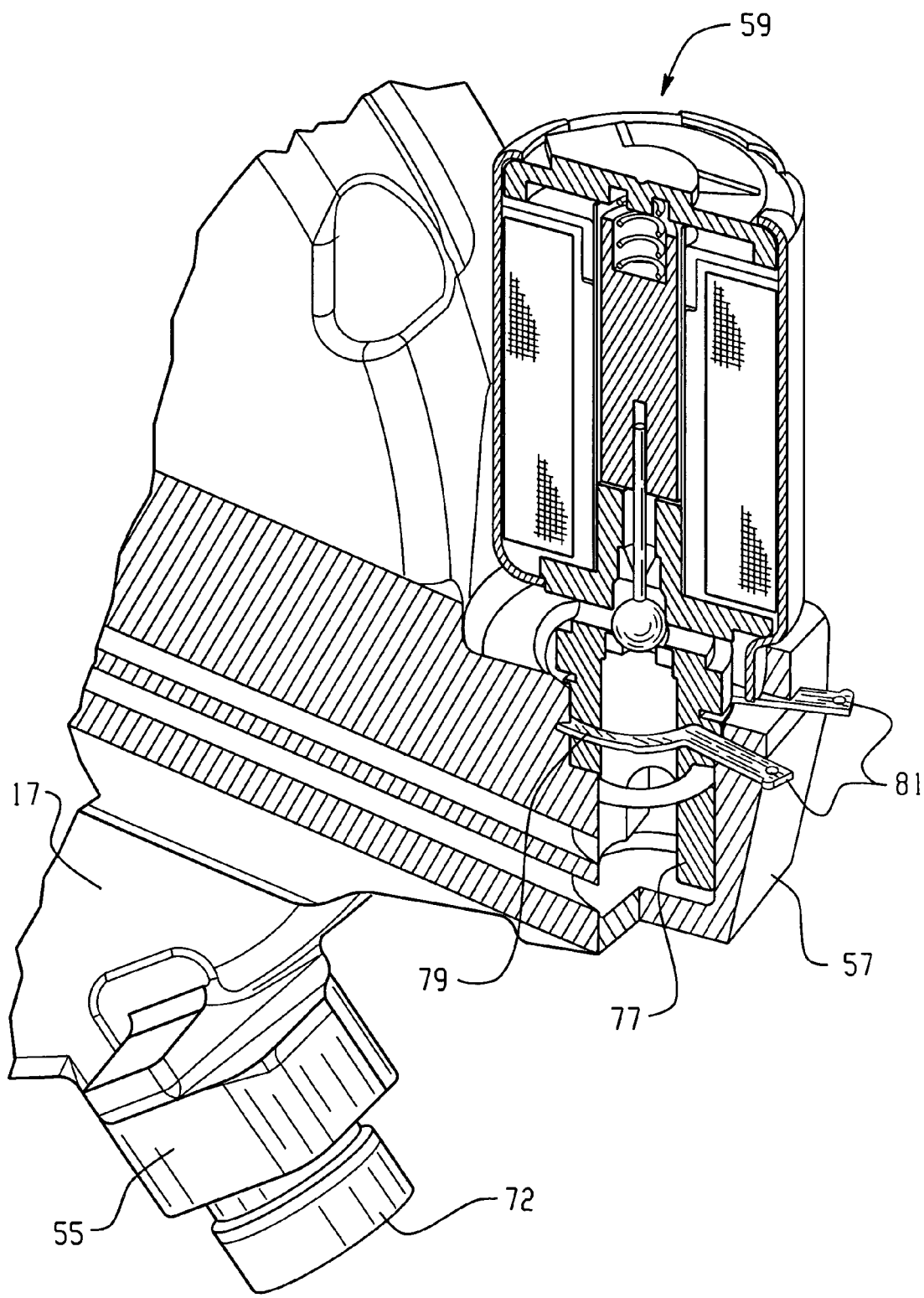
FIG. 6 is a fragmentary, partly broken away view the plenum member, with the pressure control valve assembled thereto, in accordance with one aspect of the present invention.

Referring now primarily to FIGS. 5 and 6, the pressure control valve assembly 59 is preferably shipped to the axle assembly plant as an individual part, separate from the coupling device 11. In accordance with another important aspect of the invention, and as will be described in greater detail subsequently, the pressure control valve assembly 59 is of the "quick connect" type, as that term is generally well known to those skilled in the art. By way of example only, and as may best be seen in FIG. 6, the pressure control valve assembly 59 includes a lower, inlet portion 77, adapted to be disposed within the port portion 57 and retained therein, after the assembly process of the present invention, by means of an expanding clip 79, shown best in FIG. 6. The expanding clip 79 includes a pair of radially-extending tabs 81 which, after assembly, are in the expanded (spread apart) position shown in FIG. 6, in which the annular portion of the expanding clip 79 is in engagement with an annular groove formed within the port portion 57, thus retaining the valve assembly 59 therein. Those skilled in the art will understand that various other quick-connect arrangements could be used, within the scope of the invention, to retain the pressure control valve 59 within the port portion 57.

Referring now primarily to FIG. 5, it may be seen that when the pressure control valve assembly 59 is being shipped, the expanding clip 79 is maintained in a "pre-assembly" position by means of a plastic retainer 83, including a retainer portion 85, which surrounds the radially-extending tabs 81 of the expanding clip 79, and holds the tabs 81 in a position in which they are immediately adjacent each other, i.e., the "pre-assembled" position. Formed integrally with the retainer portion 85 is an upstanding portion including a pair of tabs 86 (only one of which is shown in FIG. 5), which extend radially on either side of an anti-rotation tab 59T, which is fixed relative to the housing of the pressure control valve assembly 59. As may also be seen in FIG. 5, the pressure control valve assembly 59 includes a portion, designated 87, which comprises an electrical connector, by means of which a wiring harness may be connected to the valve assembly 59, to provide appropriate electrical input signals thereto, in a manner well known to those skilled in the art.

As will be appreciated by those skilled in the vehicle assembly art, the eventual presence (as part of the coupling device 11) of the pressure control valve assembly 59, adds substantial difficulty and potential complication to the method of assembly of the coupling device 11 within the overall axle housing. For example, those skilled in the art will recognize that there would not be sufficient room within the axle housing for the valve assembly 59 to be oriented radially, relative to the axis (i.e., the axis of rotation of the axle shafts) of the coupling device 11. Thus, the valve assembly 59 is located as shown in FIG. 5. However, as may best be seen in FIG. 3 (from which the valve assembly 59 is omitted) it is not possible to install the valve assembly 59 prior to fastening the ring gear R to the flange portion 18. If the valve assembly 59 were already present, access to the fastener at the three o'clock position would be blocked.

Referring now again primarily to FIGS. 2 and 3, when the coupling device 11 is received at the axle (or vehicle) assembly plant, as that term was previously defined, it is in the condition shown in FIG. 2, except that the ring gear R and its fasteners are not yet part of the subassembly. The first step therefore in the actual assembly process (i.e., the assembly of the coupling device 11 within the axle housing H) is to slide the ring gear R over the gear housing 13 until it is in place, adjacent the flange portion 18, i.e., in the position shown in FIGS. 1 and 2. The next step is to insert in each of the holes 18H within the flange portion 18 a suitable fastener, which, in the subject embodiment, comprises a socket head cap screw 89. In the subject embodiment, and by way of example only, there are ten of the cap screws 89, and although within the scope of the present invention, various other types of fastener could be utilized, it may be seen, especially from FIG. 3, that the space surrounding each of the cap screws 89 is very limited, and access to another type of fastener, such as a hex head bolt, could be quite difficult.

In accordance with an important aspect of the invention, it may be seen in FIG. 3 that each of the "required features" defined by the plenum member 17 (i.e., the inlet portion 55; the port portion 57; and the tabs 61 and 66) are all located, circumferentially, such that none of the required features blocks access to the cap screws 89. After the ring gear R is in place, adjacent the flange portion 18, each of the cap screws 89 is disposed in threaded engagement with the ring gear R. Typically, this initial threaded engagement of each of the cap screws 89 into the ring gear R is accomplished by hand by the assembly operator. Once each of the cap screws 89 is in initial threaded engagement with the ring gear R, as shown in FIG. 3, the next step in the assembly process is to utilize a specially-equipped, multi-head driver (well known in the art and not shown herein) which is moved into place, to be in driving engagement with all ten of the cap screws 89 simultaneously. The assembly operator then actuates the driver to complete the threaded engagement of all ten of the cap screws 89 at once, until the torque limit of the individual driver heads is reached at each cap screw 89.

With the ring gear R in place, and all of the cap screws 89 tightened, the entire coupling device 11 is now in the condition shown in FIG. 2. The next step in the assembly process is to place the entire coupling device 11 within the axle housing H, one aspect of which is illustrated in the fragmentary view of FIG. 4. What is identified in FIG. 4 as the axle housing H is in reality the entire axle housing, but minus a cover (not shown herein but put in place at the very end of the assembly process). In the subject embodiment of the present invention, but by way of example only, the axle housing H defines a pair of surfaces 91 which, relative to FIG. 3, would lie in a vertical plane passing through, or at least near, the axis of the coupling device. Therefore, when the coupling device 11 is placed within the differential housing H, the two anti-rotation tabs 61 each engage an adjacent one of the surfaces 91, thereby preventing any rotation of the coupling device 11 (during operation of the vehicle) within the housing H, regardless of direction of rotation of the device.

Referring again primarily to FIG. 4, at the stage of the assembly process represented in FIG. 4, the bearing set 67 is in place about the hub portion 53 (i.e., the condition shown in FIG. 3, as described previously), and as shown in FIG. 4. Typically, but by way of example only, the outer race (not shown herein for simplicity) for the bearing set 67 would already be in place (about the bearing set 67) within the housing H, and at this stage of the assembly process, a bearing cap (not shown herein) would be bolted into place, by bolts adapted to be threaded into a pair of internally threaded bores 93. Although not shown herein, it should be understood that the same step of bolting in place a bearing cap would be done at the opposite end of the coupling device 11, for the bearing set 67 disposed on the hub portion 65. Once the two bearing caps are bolted in place, the coupling device 11 is basically "installed" within the differential housing H.

The next step in the assembly process is for the assembly operator to manually seize the tab portion 75 of the oil plug disposed within the port portion 57, and quickly remove both the oil plug 71 in the inlet portion 55 as well as the oil plug in the port portion 57. At this point, some oil within the coupling device 11 may leak out of the inlet portion 55, but at some subsequent step in the assembly process, the required amount of oil will be introduced into the reservoir within the differential housing H. Therefore, as soon as the coupling device 11 begins to operate, whatever amount of fluid has leaked out of the device will be replaced by fluid being drawn into the device through the inlet portion 55.

Once the oil plug is removed from the port portion 57, the next step in the assembly process is to install the pressure control valve assembly 59 (as shown in FIG. 5) by placing the lower, inlet portion 77 into the mating opening in the port portion 57, and then manually removing the plastic retainer 83. As may best be seen in FIG. 6, when the retainer portion 85 is no longer holding the radially-extending tabs 81 together, they are permitted to spread, to the position shown in FIG. 6, permitting the expanding clip 79 to open and engage the mating internal groove within the port portion 57, thus securing the pressure control valve assembly 59 in its assembled position.

With the valve assembly 59 in place, a suitable wiring harness (not shown herein) is brought in through a suitable opening in the housing H (not shown herein) and is plugged into the electrical connector 87. Preferably, the wiring harness is disposed to the left (in FIG. 2) of the wiring retention tab 66, such that the wiring harness makes contact with only the stationary plenum member 17, and not with the rotating housing (clutch housing 15) of the coupling device 11.

The axle shafts may now be inserted and retained, within and relative to the side gears 25 and 27, by any of a number of well known axle assembly and retention methods, which are beyond the scope of the present invention. At this point, the process of assembling the coupling device 11 within the axle housing assembly H is completed, except for any final steps such as attaching the cover mentioned previously over the opening (shown in FIG. 4) of the axle housing H. After the cover is in place, the reservoir would then be filled with fluid, typically through a threaded fitting in the cover. It should be understood by those skilled in the art that many of the recited assembly steps could be performed in some other order beside that set forth herein, except as may be specifically set forth in the appended claims.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of assembly of a coupling device to an input ring gear, for eventual installation within an axle housing, said method of assembly comprising the steps of:

providing a housing defining a clutch cavity, a clutch assembly disposed in said clutch cavity, a clutch apply member disposed in a pressure chamber and operable to bias said clutch assembly into torque transmitting relationship in response to the presence of pressurized fluid in said pressure chamber; said coupling device including a plenum member operably associated with said housing to define a fluid flow path providing fluid communication between a reservoir disposed within said axle housing and said pressure chamber, said fluid flow path being in fluid communication with a source of pressurized fluid; said housing including a flange portion defining a plurality of fastener holes and being adapted to have said input ring gear attached thereto by means of a plurality of fasteners; said plenum member comprising a generally annular plenum portion, and a plurality of required features extending from said plenum portion;

configuring said plenum member such that each of said required features is disposed circumferentially between an adjacent pair of said fastener holes;

installing said input ring gear about said housing of said coupling device, from an axial end opposite said plenum member, into assembly position adjacent said flange portion;

inserting each of said plurality of said fasteners through one of said fastener holes and into initial threaded engagement with said input ring gear; and driving, by means of a fastener driver, all of said plurality of fasteners into full threaded engagement, substantially simultaneously, with said input ring gear.

2. A method, of assembly as claimed in claim 1, characterized by one of said required features comprises a fluid inlet portion extending radially toward said reservoir, and further including an oil plug disposed within said fluid inlet portion, said oil plug further including a tab portion; said method of assembly comprising the further step, subsequent to said driving step, of manual removal of said oil plug, neither said oil plug nor said tab portion blocking access of said fasteners to said fastener holes.

3. A method of assembly as claimed in claim 1, characterized by one of said required features comprises a valve mounting portion, said coupling device including an electromagnetic valve member operable to control fluid pressure in said fluid flow path; said method of assembly comprising the further step, subsequent to said driving step, of operably attaching said valve member to said valve mounting portion.

4. A method of assembly as claimed in claim 1, characterized by one of said required features comprises an anti-rotation tab, extending both radially and axially from an end surface of said plenum member, said axle housing defining a surface disposed adjacent said anti-rotation tab, and adapted for engagement therewith, when said coupling device is installed within said axle housing.

5. A method of assembly as claimed in claim 1, characterized by one of said required features comprises a wiring retention tab operable to prevent engagement of a wiring harness with said rotating housing of said coupling device, but to permit engagement of said wiring harness with said plenum member.

* * * * *